US005331022A

United States Patent [19]

Jochmann et al.

[11] Patent Number: 5,331,022

[45] Date of Patent: Jul. 19, 1994

[54] METHOD FOR THE REDUCTION OF RADON LOAD IN CLOSED SPACES

[75] Inventors: Ludwig Jochmann; Josef Hess, both of Zug, Switzerland

[73] Assignee: Hesco AG, Industrieconsulting & Industrievertretungen, Zug, Switzerland

[21] Appl. No.: 934,734

[22] PCT Filed: Apr. 6, 1992

[86] PCT No.: PCT/CH92/00063

§ 371 Date: Oct. 1, 1992

§ 102(e) Date: Oct. 1, 1992

[87] PCT Pub. No.: WO92/18984

PCT Pub. Date: Oct. 29, 1992

[30] Foreign Application Priority Data

Apr. 9, 1991 [CH] Switzerland ........................ 1046/91

[51] Int. Cl.$^5$ ........................ G21F 1/10; C08L 27/16; C08L 33/06; C08L 39/06

[52] U.S. Cl. .................................... 523/136; 524/516; 524/527; 524/560; 524/568

[58] Field of Search ................ 523/136; 524/138, 516, 524/527, 560, 561, 562, 568; 252/478

[56] References Cited

U.S. PATENT DOCUMENTS

| | | | |
|---|---|---|---|
| 2,748,027 | 5/1956 | Meier | 524/568 |
| 2,909,449 | 10/1959 | Banigan | 524/568 |
| 3,779,971 | 12/1973 | Isenburg | 524/568 |
| 4,543,386 | 9/1985 | Padget et al. | 524/527 |
| 4,543,387 | 9/1985 | Padget et al. | 524/527 |
| 4,544,699 | 10/1985 | Biale | 524/568 |

*Primary Examiner*—Paul R. Michl
*Assistant Examiner*—Peter Szekely
*Attorney, Agent, or Firm*—Herbert Dubno

[57] ABSTRACT

For the reduction of the radon load in enclosed spaces, an aqueous, solvent and softener-free dispersion of a vinylidene chloride-acrylate-copolymer is applied to the boundary surfaces of the room and left to dry. The dispersion contains also a nonionic surfactant on a base of alkylphenolethoxylate with a proportion of 10 mole ethylene oxide, a vinyl pyrrolidone-copolymer and a defrothing agent.

7 Claims, No Drawings

METHOD FOR THE REDUCTION OF RADON LOAD IN CLOSED SPACES

CROSS REFERENCE TO RELATED APPLICATIONS

This application is a national phase application of PCT/CH 92/00063 which is based upon a Swiss national application 1046/91 filed 9 Apr. 1991 under the International Convention.

FIELD OF THE INVENTION

The invention relates to a method of reducing a radon load in closed spaces by sealing same, to a composition for carrying out the method, and to a method for producing the composition for the protection of rooms and whose action massively diminishes radon infiltration.

BACKGROUND OF THE INVENTION

The radiation load on the human body consists primarily of radiation coming from technical apparatus (television, x-ray machines, etc.), cosmic radiation and artificial and natural radioactivity. Lately, we have become increasingly aware of the danger of natural radioactive radiation. This acts not only at the location of deposits of uranium-containing ore and rock, but can be found also in residential and other buildings, because of the use of uranium-containing construction materials.

Natural radioactivity appears in all elements with an atomic number higher than 80. The radioactive isotopes of these elements have mostly very short half-lifes and could not be detected today—approximately 6 billion years after their formation. However, they continue to form again and again due to alpha or beta decomposition from the decomposition of the uranium isotopes 238 and 235 with a very long life, as well as of the thorium isotope 232. As a result of the longevity of the uranium isotopes, the radioactive radiation coming from uranium is very low. However, in the course of the uranium disintegration chain which finally ends with the inactive lead a new gaseous intermediate product appears, radon 222, which disintegrates again within a short time period, but not without leaving behind a number of stable radioactive products.

Radon is a colorless, tasteless and odorless radioactive gas which due to its high atomic weight collects mainly at the bottoms of rooms. Particularly basement rooms and other rooms bordering on the ground can therefore have a considerable degree of radioactive contamination. Also materials used in construction, such as clay, construction materials containing pumice, cemented stones with slag additives or granite often contain uranium emitting gaseous, radioactive radon.

Lately, public opinion has become increasingly sensitive to the dangers of radioactive contamination, due to various accidents in nuclear power plants. At the same time, there is an increased awareness of the dangers resulting from other types of radiation, such as widespread medical testing and radiation therapy, as well as the dangers of natural radioactivity. Scientific research has proven that the health-injuring effects of natural radioactivity are considerably higher than has been assumed. It has for instance been established that in certain living spaces the radioactivity level is much higher than acceptable. It has been found that the cause is the accumulation of radon in dangerous concentrations in residential and other buildings, whereby especially the building basement floors with poor ventilation and the buildings without basements, erected directly on the soil, are particularly afflicted by radon infiltrating from the surrounding soil.

For this reason, lately measures for the reduction of radon infiltration in living spaces have been proposed. However, the known measures are either effective for only a short time, e.g. intensive ventilation of these rooms, or complicated, expensive and short-lived. For instance wall hangings of plastic foil, e.g. polyvinyl chloride or polyurethane or of light metal, have been proposed. It has also been proposed to seal the rooms with polyurethane resins. However, these known steps have not proven themselves in practice, since they can not completely cover the nooks and crannies and also can not evenly and completely cover the curves or corners. Besides, these known web-like coverings made of plastic or light metal, unlike the usual wall coverings, cannot be covered with tiles or plaster, or they tend to disintegrate or lose adhesion due to their incompatibility with the usual construction substrates and because of humidity.

It is, therefore, an object of the invention to avoid the drawbacks of the known methods for the reduction of the radon load in closed spaces and particularly to provide a long-term and highly efficient method which makes it possible to prevent the infiltration of radon gas from the ground and the emission of this gas from construction materials into the rooms to be protected.

It is a further object of the invention to provide a method which makes it possible to apply to external construction parts (walls, floors and ceilings) a substance for the protection against radon infiltration, with simple and traditional means.

Yet another object of the invention is to provide a substance for blocking incursion of radon and which can be applied to all traditional building materials, such as stone, concrete, gypsum, etc., but which remains stable under the action of humidity and chemicals.

Finally, another object of the invention is to provide a substance which, applied according to the method of the invention, lends itself to the application of decorative surfaces or of functional layers.

DESCRIPTION OF THE INVENTION

According to the invention, this problem is solved by applying to the boundary surfaces of the room to be protected an aqueous dispersion based on vinylidene chloride-acrylate-copolymer and permitting the dispersion to dry.

According to a preferred embodiment of the method of the invention, to the boundary surfaces of the rooms an aqueous dispersion is applied which, besides a vinylidene chloride-acrylate-copolymer, also contains a nonionic surfactant based on an alkyl phenol-ethoxylate with a proportion of 10 moles of ethylene oxide per mole of the alkylphenolethoxylate, a vinyl pyrrolidone-copolymer or a diurethane and a defrothing agent, preferably a paraffinic mineral oil in combination with a hydrophobic component and a silicone polymer.

The agent used by the method of the invention has a content of solid substances ranging between 45 and 65% by weight, preferably between 50 to 60% by weight, particularly 55% by weight.

A preferred agent used for the protection of rooms against contamination by radon infiltration by applying it to the boundary surfaces of the rooms to be protected contains 100 parts by weight of a dispersion of vinylidene chloride-acrylate-copolymer with a content of solid matter ranging between 45 and 65% by weight, preferably between 50 and 60% by weight, particularly about 55% by weight of solid matter, and either a/ up to 2% of a vinyl pyrrolidone-copolymer or b/ up to 10% by weight of a nonionic surfactant on a basis of alkyl phenol-ethoxylate with a proportion of approximately 10 mole ethylene oxide up and to 5% of a diurethane solution in water/propylene glycol/isopropanol, as well as a defrothing agent, preferably a paraffinic mineral oil in combination with a hydrophobic component and a silicone polymer.

SPECIFIC DESCRIPTION

The preparation of a preferred agent for the protection of rooms against contamination by radon infiltration is explained below by way of example.

a/ 100 parts by weight of an aqueous, solvent-free and softener-free dispersion of vinylidene chloride-acrylate-copolymer with a content of solid matter of about 55% are introduced into a container provided with an agitator. This product is commercially available under the name of "Diofan". By continuously agitating with a gentle speed of 50 to 200 rotations per minute, slowly 2.4 parts by weight of nonionic surfactant per mole of alkylphenolethoxylate are added. This product is commercially available under the name "Lutensol AP10". With further agitating, 1.2 parts by weight of a diurethane solution in water/propylene glycol/isopropanol (3:2:1) are added. This product is commercially available under the name "Collacral PU76". Finally 0.1 parts by weight of a defrothing ägent, e.g. BYK-antifoaming agent 035, are added and further agitated until a homogeneous mass results, which requires a time span of about 10 to 30 minutes.

b/ The process according to a/ is repeated, whereby instead of the nonionic defrothing agent and the diurethane thickening agent, according to the desired viscosity, a mixture of 2-3 parts by weight of an aqueous solution of a vinyl pyrrolidone copolymer, commercially available under the name of "Collacral VL" is added with two parts by weight water. After the addition of the defrothing agent the same process steps as in a/ are followed.

The preparation takes place at room temperature, i.e. at a temperature within the range of +18 to +30 degrees C., without additional heating.

The obtained mixture has a content of solid matter of 55% (+/−1%). It is an aqueous dispersion of plastic material, its main component being polyvinylidene chloride-acrylate.

A method for the preparation of an agent for the protection of rooms against radon infiltration can be characterized in that to 100 parts by weight of a solvent and softener-free aqueous dispersion of a vinylidene chloride-acrylate-copolymer with a proportion of solid matter of 45-65% by weight, which is being continuously agitated, 5 to 10 parts by weight of a nonionic surfactant based on alkylphenol ethoxylate with a proportion of about 10 mole ethylene oxide, 2 to 5 parts by weight of a solution of diurethanes in a water/propylene glycol/isopropanol mixture as thickening agent, which contains the components preferably in a proportion by weight of 3:3:1, and 0.1 to 1 parts by weight of a defrothing agent are added, all these being agitated until a homogeneous mass results.

Alternatively a method for preparing an agent for the protection of rooms against radon infiltration can be characterized in that to 100 parts by weight of a solvent and softener-free aqueous dispersion of vinylidene chloride-acrylate-copolymer with a solid-matter content of 45-65% by weight, which is being continuously agitated, 1 to 10 parts by weight of a 10-20% by weight aqueous solution of vinyl pyrrolidone-copolymer as a thickening agent and 0.1 to 1 parts by weight of a defrothing agent are added, all these being agitated until a homogeneous mass results.

We claim:

1. A method of reducing a radon load in a space bounded by surfaces, said method comprising the steps of:

(a) providing a composition consisting essentially of
a vinylidene chloride-acrylate copolymer dispersion in water,
an alkylphenolethoxylate nonionic surfactant containing 10 moles of ethylene oxide per mole of the alkylphenolethoxylate,
a thickening agent selected from the group which consists of
a vinyl pyrrolidone copolymer, and
a diurethane solution in a water/propylene glycol-/isopropanol mixture, and
a defrothing agent;
(b) applying said composition to said boundary surfaces; and
(c) allowing said composition to dry on said surfaces.

2. The method defined in claim 1, further comprising the step of preparing said composition by:
slowly mixing a dispersion of the vinylidene chloride-acrylate copolymer having about 45 to about 65% solid matter in water;
slowly adding to said dispersion during mixing thereof about 2.4 parts by weight per 100 parts by weight of the dispersion of said nonionic surfactant;
then adding to the dispersion during agitation thereof about 2 to about 5 parts by weight per 100 parts by weight of the dispersion of the diurethane solution or about 1 to about 10 parts by weight of a 10 to 20% aqueous solution of the vinyl pyrrolidone copolymer; and
then adding about 0.1 to 1 part by weight per 100 parts by weight of the dispersion of said defrothing agent.

3. The method defined in claim 2 wherein said thickening agent is about 1.2 parts by weight of the diurethane solution in 3:2:1 water/propylene glycol/isopropanol per 100 parts by weight of the dispersion.

4. The method defined in claim 2 wherein said thickening agent is 2 to 3 parts by weight of the vinyl pyrrolidone-copolymer solution per 100 parts by weight of said dispersion.

5. The method defined in claim 2 wherein said defrothing agent is used in an amount of 0.1 parts by weight per 100 parts by weight of the dispersion.

6. The method defined in claim 2 wherein said composition is prepared at a temperature between 18° and 30° C. without heating and the composition is agitated subsequent to addition of the defrothing agent for a period of 10 to 30 minutes.

7. The method defined in claim 2 wherein said dispersion has a solids content of about 55%.

* * * * *